(12) United States Patent
Peng

(10) Patent No.: US 7,298,563 B1
(45) Date of Patent: Nov. 20, 2007

(54) SUPPORTING MEMBER FOR PORTABLE DIGITAL VIDEO DISK PLAYER

(75) Inventor: Juen-Tien Peng, Chung Li (TW)

(73) Assignee: Action Electronics Co., Ltd., Chung Liind Zone, Chung Li (TW)

(*) Notice: Subject to any disclaimer, the term of this patent is extended or adjusted under 35 U.S.C. 154(b) by 60 days.

(21) Appl. No.: 11/421,048

(22) Filed: May 30, 2006

(51) Int. Cl.
*G02B 7/02* (2006.01)
(52) U.S. Cl. .................. 359/823; 359/822; 359/811; 359/813; 359/824
(58) Field of Classification Search ............. 359/823, 359/819, 821, 822, 813, 811, 824
See application file for complete search history.

(56) References Cited

U.S. PATENT DOCUMENTS

2003/0235329 A1* 12/2003 Komatsuzaki et al. ...... 382/124
2006/0174812 A1* 8/2006 Marszalek et al. ............ 116/4

* cited by examiner

*Primary Examiner*—Alicia M. Harrington
*Assistant Examiner*—Brandi Thomas
(74) *Attorney, Agent, or Firm*—Ming Chow; Sinorica, LLC

(57) ABSTRACT

A supporting member for a portable digital video disk player has a rotatable member and a base for accommodating the rotatable member. The rotatable member includes a rotatable seat, at least one elastic member and at least one fastener pressing the at least one elastic member. Each of the rotatable seat and the at least one elastic member has a through hole. The base has at least one protruding element drilling through the through holes of the rotatable seat and the at least one elastic member. The rotatable seat can rotate relative to the base.

7 Claims, 4 Drawing Sheets

SUPPORTING MEMBER FOR PORTABLE DIGITAL VIDEO DISK PLAYER

BACKGROUND

The present invention relates to a portable digital video disk (DVD) player, and especially to a supporting member used for the portable DVD player.

Modern portable DVD player is typically provided with a housing that serves as an enclosure or chassis for the components of the DVD player. A screen for viewing the video is located on a top surface of the housing. A host for providing the video is located on a bottom surface of the housing. The host has a driving system and a video transport for accommodating the disk. The housing pivotally fixed on a supporting member. The supporting member has a hinge 1 (shown in FIG. 1).

The hinge 1 has a bar 10 and two rotatable axes 20 pivotally located on two ends of the bar 10, respectively. Each of the two rotatable axes 20 is L-shaped, which has a vertical plate 21 and a horizontal plate 22 orthogonally connecting with the vertical plate 2. The vertical plate 2 is pivotally fixed on the bar 10 and can rotate around the bar 10. The bar 10 is fixed on a base (not shown) of the supporting member through screws (not shown) and the two horizontal plates 22 are connected with the housing. One rotatable axis 20 drives the housing to rotate around the bar 10 and another axis 20 locates the housing at any angle in the rotating process by a plurality of ball bearings (not shown).

However, the hinge 1 further needs a plurality of washer for preventing the two rotatable axes from falling off. In addition, the plurality of ball bearings make the hinge 1 complex. Therefore, the hinge 1 adds the cost of the portable DVD player.

What is needed, therefore, is a simple supporting member for portable DVD player.

BRIEF SUMMARY

A supporting member for a portable digital video disk player has a rotatable member and a base for accommodating the rotatable member. The rotatable member includes a rotatable seat, at least one elastic member and at least one fastener pressing the at least one elastic member. Each of the rotatable seat and the at least one elastic member has a through hole. The base has at least one protruding element drilling through the through holes of the rotatable seat and the at least one elastic member. The rotatable seat can rotate relative to the base.

A portable digital video disk player has a housing accommodating a screen and a host, and a supporting member for accommodating the rotatable member. The supporting member has a rotatable member and a base. The rotatable member includes a rotatable seat, at least one elastic member and at least one fastener pressing the at least one elastic member. Each of the rotatable seat and the at least one elastic member has a through hole. The base has at least one protruding element drilling through the through holes of the rotatable seat and the at least one elastic member. The housing can rotate relative to the supporting member.

The supporting member for the portable DVD player utilizes the rotatable member cooperating with a base to realize the angle degree adjustment of the portable DVD player. The rotatable member provides the rotatable seat, the elastic member and the fastener instead of conventional hinge having complex structure. Thus, the supporting member has a simple structure and a low cost. In addition, the range of the adjustable angle degree can be controlled by the radian or the length of the elongated through hole, which makes the manufacturing process simple and improves the productivity.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Reference will now be made to the drawings to describe the preferred embodiments in detail.

Figure 1:
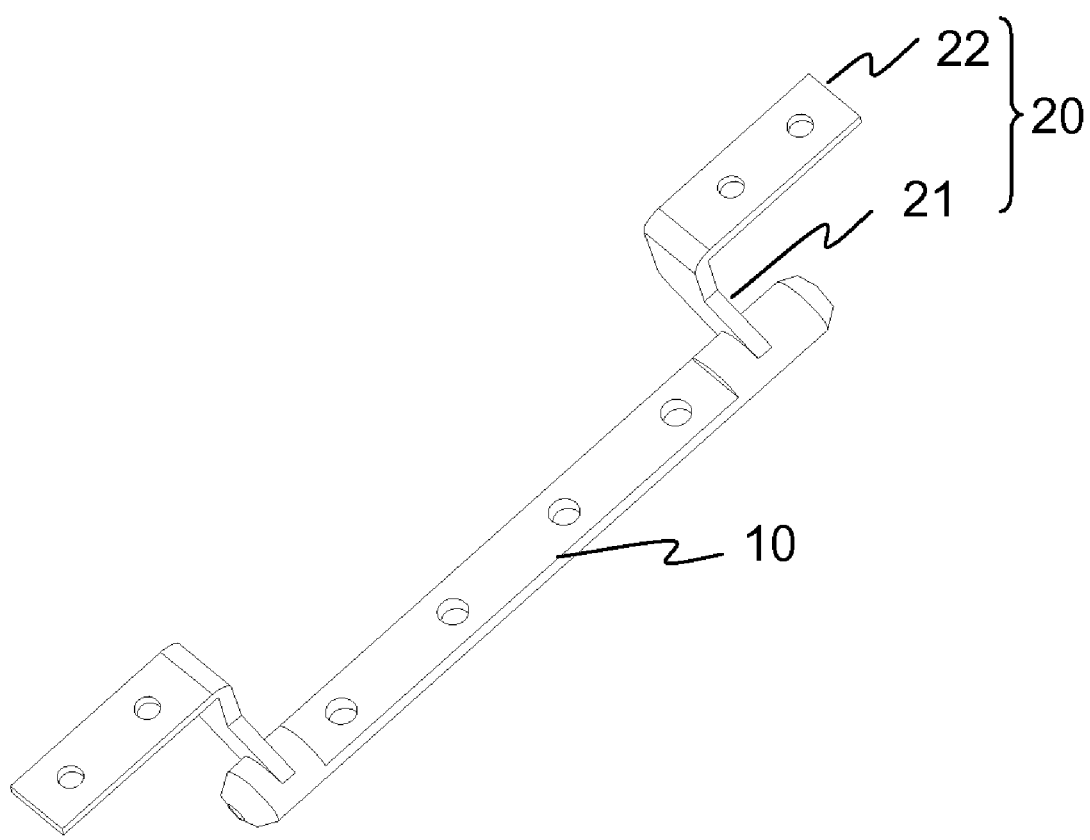
FIG. 1 is a schematic, isometric view of a conventional hinge for a portable DVD player.
Figure 2:
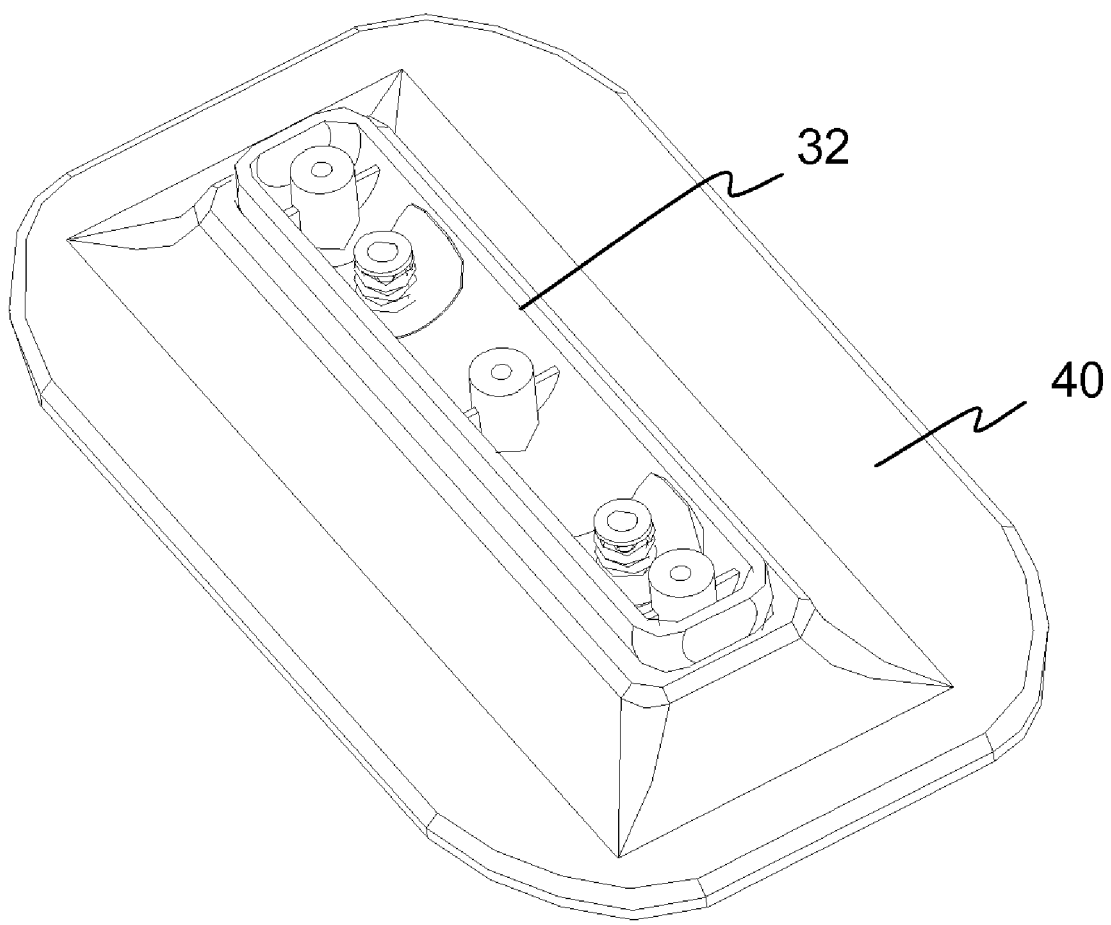
FIG. 2 is a schematic, isometric view of a supporting member for a portable DVD player according to a first embodiment of the present invention, which shows an assembly of a base and a supporting member, when a housing of the portable DVD player is perpendicularly to the supporting member.
Figure 3:
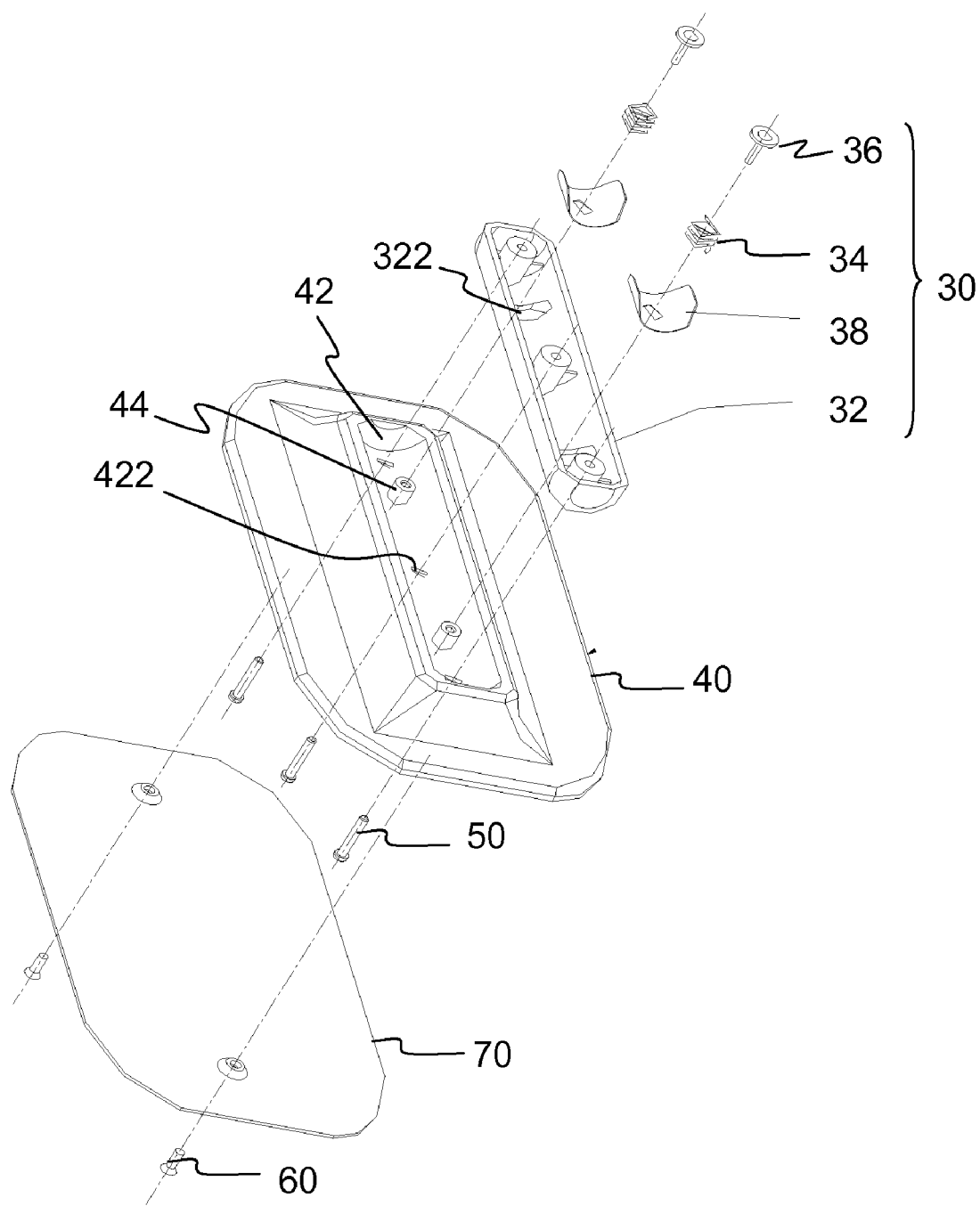
FIG. 3 is an exploded, isometric view of the supporting member of FIG. 2.
Figure 4:
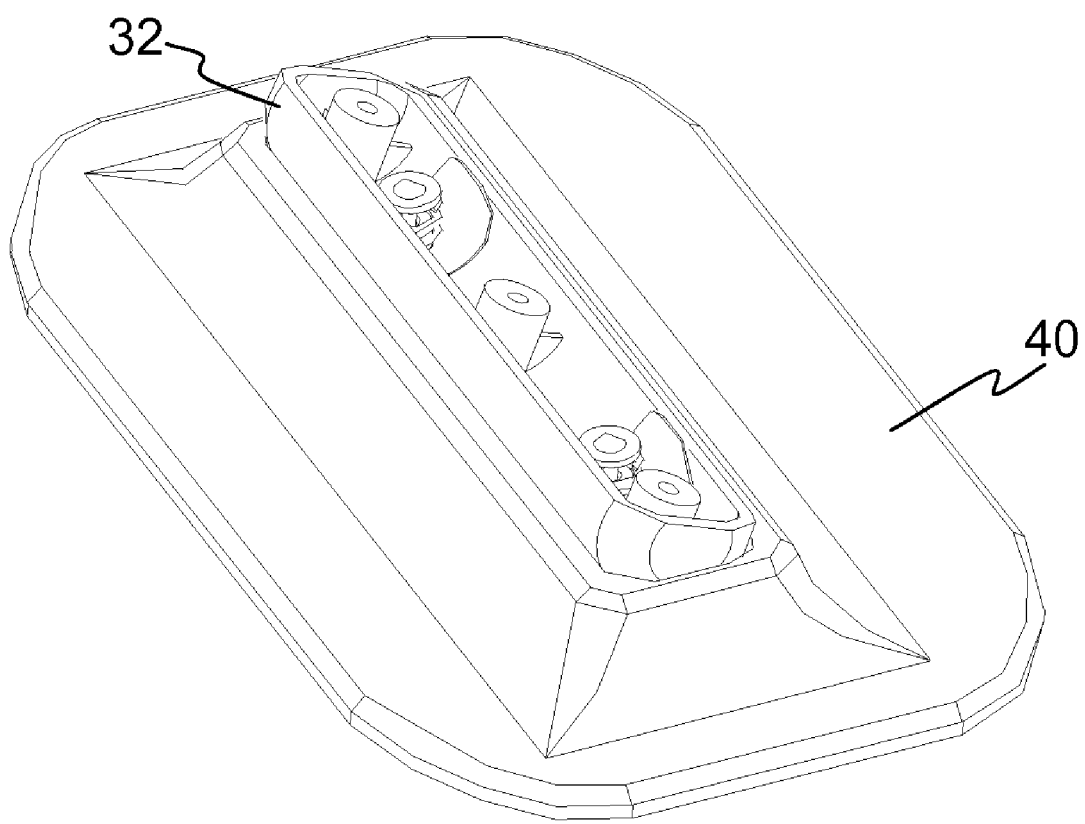
FIG. 4 is an assembly, isometric view of the supporting member of FIG. 2, when the housing of the portable DVD player rotates around the supporting member a predetermined angle degree.

Referring to FIG. 2, FIG. 3 and FIG. 4, a supporting member 3 for a portable DVD player according to a first embodiment of the present invention are shown. The supporting member 3 is used for pivotally supporting a housing (not shown) of the portable DVD player, and the housing accommodates a plurality of components of the portable DVD player, such as a screen, a host etc. The supporting member 3 has a base 40 and a rotatable member 30 assembled on the base 40.

The rotatable member 30 includes a rotatable seat 32, two washers 38, two elastic members 34 and two fasteners 36. The rotatable seat 32 is a hollow half-cylinder, which has a circular arc circumference surface and two elongated through holes 322 are formed thereon. The two elastic members 34 and the two fasteners 36 are used to locate the rotatable seat 32, and the washers 38 is used to lessen the friction between the rotatable seat 32 and the elastic members 34. Each of the two washers 38 and the elastic members 34 has a through hole (not labeled). In this embodiment, the elastic member 34 is a spring, which may be any other elements having elastic characteristics, such as elastic plate. The fastener 36 may be a screw or a nut.

The base 40 has a notch 42 for accommodating the rotatable seat 32 and a bottom plate 70 screwing on a bottom surface of the base 40. The notch 42 is in a shape of half cylinder, having an inner surface (not labeled) corresponding to the circular arc circumference surface of the rotatable seat 32. The notch 42 further has two protruding pole 44 extending outwardly from the inner surface, corresponding to the two elongated through holes 322 of the rotatable seat 32. Each protruding pole 44 has an aperture, which has a size matching with that of the fasteners 36.

In assembly, the rotatable seat 32 of the rotatable member 30 is accommodated in the notch 42 of the base 40 and fixed thereon by the two protruding poles 44 of the notch 42 drilling through the two elongated through holes 322 of the rotatable seat 32, respectively. The two washers 38 and the two elastic members 34 are set on the two protruding poles 44 through their through holes, respectively. In addition, the two fasteners are fixed on the two protruding poles 44 by screwing on the apertures of the two protruding poles 44, respectively, which press the elastic members 34 and make the elastic members 34 produce elastic deformation and provide an elastic force to the rotatable seat 32. After the rotatable member 30 and the base 40 are assembled together, the housing of the portable DVD player can be fixed on the supporting member 3 by a plurality of screws 50, which screws in the corresponding elongated through holes 422 of the base 40, the rotatable member 30 and the housing. Thus, the angle adjustment of the portable DVD player can be realized.

When a force is provided on the housing of the DVD player for adjusting the angle, the rotatable seat 32 rotates around its rotating axis and drives the housing to rotate to an ideal angle. In addition, the two elastic members 34 apply an adequate pressure to locate the housing of the portable DVD player in the ideal angle. The range of the adjustable angle can be controlled by the radian or the length of the elongated through holes 322 and 422.

The supporting member 3 for the portable DVD player utilizes the rotatable member 30 cooperating with a base 40 to realize the angle adjustment of the portable DVD player. The rotatable member 30 provides the rotatable seat 32, the elastic member 34 and the fastener 36 instead of conventional hinge 2 having complex structure. Thus, the supporting member 3 has a simple structure and a low cost. In addition, the range of the adjustable angle degree can be controlled by the radian or the length of the elongated through hole 322, which makes the manufacturing process simple and improves the productivity.

In alternative embodiments, the amount of the protruding pole 32 can be decided by the size of the housing of the portable DVD player, which may be three, four or more.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A supporting member for a portable digital video disk player, comprising:
   a rotatable member which comprises a rotatable seat, two elastic members, two washers, and two fasteners, wherein the rotatable seat having at least two through holes, and the two elastic members each having a through hole, and the two washers each having a through hole;
   the rotatable seat is a hollow half-cylinder which has a circular arc circumference surface and two elongated through holes;
   the two elastic members and the two fasteners both together locate the rotatable seat;
   the two washers loosen friction between the rotatable seat and the elastic members;
   a base for accommodating the rotatable member, which comprises at least one protruding elements drilling through the through holes of the rotatable seat and the two elastic member,
   whereby the rotatable seat rotates relative to the base:
   the base further comprises a notch for accommodating the rotatable seat, wherein
   the notch has an inner surface corresponding to a circumference surface of the rotatable seat;
   the notch further comprises a plurality of protruding poles extending outwardly from inner surface of the notch and corresponding to the two elongated through holes;
   each of the plurality of protruding poles has an aperture which has a size matching with aperture size of the two fasteners;
   the base further comprises a bottom plate which is screwed on the base;
   the at least one protruding elements each having an aperture, and each fastener is fixed on one protruding element though the respective aperture;
   each of the two washers is disposed between the rotatable seat and one of the two elastic members, wherein
   each of the two elastic member is a spring or an elastic plate, wherein each of the two elastic members produces elastic deformation and provides an elastic force to the rotatable seat.

2. The supporting member for a portable digital video disk player as claimed in claim 1, wherein the fastener is a screw or a nut.

3. The supporting member for a portable digital video disk player as claimed in claim 1, wherein the two elastic members are rubbers.

4. The supporting member for a portable digital video disk player as claimed in claim 1, wherein the rotatable member is fixed onto the video disk player by screws.

5. The supporting member for a portable digital video disk player as claimed in claim 4, wherein the rotatable seat rotates around rotating axis of the rotatable seat.

6. The supporting member for a portable digital video disk player as claimed in claim 1, wherein the position angle of the video disk player is controlled by radian or length of the two elongated holes.

7. The supporting member for a portable digital video disk player as claimed in claim 1, wherein quantity of the plurality of protruding poles is determined by size of the video disk player.

* * * * *